3,689,278
TEA PROCESS
Robert J. Carbonell, Stamford, Conn., assignor to Standard Brands Incorporated, New York, N.Y.
No Drawing. Continuation-in-part of application Ser. No. 707,366, Feb. 7, 1968. This application Oct. 21, 1970, Ser. No. 82,801
The portion of the term of the patent subsequent to Feb. 7, 1985, has been disclaimed
Int. Cl. A23f 3/02
U.S. Cl. 99—77    5 Claims

ABSTRACT OF THE DISCLOSURE

A method of preparing tea concentrates which when reconstituted in hot water have improved flavor and aroma characteristics comprising subjecting tea to a flavor and aroma extraction process and collecting flavor and aroma constituents, mixing the constituents with soluble tea solids to provide an aqueous mixture having a solids concentration of above about 20 percent by weight, freeze drying the mixture and mixing it with a spray dried instant tea.

---

This application is a continuation-in-part of application Ser. No. 707,366 filed Feb. 7, 1968, now Pat. No. 3,554,761.

This invention relates to an improved method of preparing dry, water soluble tea concentrates which when reconstituted in hot water have substantially the flavor and the aroma of freshly brewed tea.

Many attempts have been made in the past to produce dry water soluble tea concentrates, hereinafter referred to as "instant tea," which when reconstituted in hot water have substantially the flavor and aroma of freshly brewed tea.

Two general approaches have been taken to prepare instant tea. The first, and the one principally being used, involves extracting tea leaf with hot water and then drying the extract by the application of heat, for instance by spray drying. Spray drying is usually carried out at relatively high temperatures. Due to the high temperatures employed, many of the desired volatile aroma and flavor constituents of the tea extract are lost and, in some instances, caramel-like flavors are imparted to the dried tea.

The other general approach which has been taken to produce an instant tea is to freeze dry a tea extract. Freeze dried instant tea is generally considered to be superior in flavor and aroma to spray dried tea and is quite similar to freshly brewed tea in terms of flavor quality. This is due to the absence of caramel-like flavors typical of tea which has been dried at relatively high temperatures and also because lesser amounts of the volatile and flavor constituents contained in the extract are lost during drying because of the low temperatures employed. However, even though freeze drying provides the advantage of producing an instant tea which is more similar to freshly brewed tea than is spray dried tea, there are significant economic disadvantages associated therewith. These include the expensive equipment necessary to carry out freeze drying, the maintenance thereof, low productivity rates due to the slow rate of sublimation of the ice from the frozen tea extract, and the relatively large amount of energy required to carry out freeze drying.

It is the principal object of the present invention to provide a method of producing an instant tea which when reconstituted in hot water has improved aroma and flavor characteristics.

This object, and other objects of the present invention which will be apparent from the following, are obtained by providing a distillate of flavor and aroma constituents of tea, collecting the distillate at a temperature in the range of from about 35- to about 212° F., mixing the distillate with soluble tea solids, at least a portion of which is spray dried tea, to provide an aqueous mixture having a tea solids concentration of above about 20 percent by weight, freeze drying the aqueous mixture and mixing the freeze dried mixture wtih spray dried instant tea to obtain a level of the freeze dried mixture of from about 2.5 to about 8 percent by weight.

The distillate of flavor and aroma constituents of tea may be provided by a variety of methods. For instance, dried tea leaf may be subjected to steam distillation using either wet or dry steam or an aqueous extract of tea may be "stripped" to provide a distillate. Stripping tea extract may be accomplished by the use of an evaporator, or by passing tea extract through a distillation column such as a packed column into which steam or other suitable gases are countercurrently passed, or by any other conventional method. The preferred mode of acquiring the distillate is by stripping an aqueous extract of tea.

Dried tea leaf may be subjected to distillation conditions while it is in a column or while it is in a agitated bed, for instance, in a screw conveyor. When the tea is in a column, the tea may be wetted prior to its being subjected to distillation conditions. Under these conditions, when steaming is initiated the steam initially contacts the admixture of tea and water and causes percolation and refluxing which strips the volatile flavor and aroma constituents of the tea.

The distillates are collected or condensed at a temperature in the range of from about 35° to about 212° F. At these collection temperatures the desirable aroma and flavor constituents of tea are obtained. If desired these collected distillates may be subjected to another distillation step to provide a distillate having a greater concentration of aroma and flavor constituents.

The collected distillates or condensates are mixed with soluble tea solids, at least a portion of which is spray dried tea, to provide an aqueous mixture having a soluble tea solids concentration of at least 20 percent. Preferably, however, the soluble tea solids concentration in the aqueous mixture is from about 20 to about 45 percent by weight.

Although the total soluble tea solids in the aqueous mixture may be provided by spray dried tea, a portion of the solids may be provided by mixing suitable proportions of spray dried tea and freeze concentrated tea extract. The freeze concentrated tea extract may be prepared by methods known in the art.

After the mixture of distillates and soluble tea solids is prepared, the mixture is frozen and freeze dried by methods known in the art. Since this freeze dried mixture is used at low levels, there is no requirement that careful control of the freezing conditions be maintained such as would be required in preparing a "total" freeze dried tea where powder color and bulk densities must be carefully controlled. This permits the use of any conventional freezing technique, such as tray freezing, blast freezing, belt freezing etc.

The frozen material may be freeze dried in slab or particulated form. This freeze dried material is then incorporated into spray dried instant tea at levels of from about 2.5 to about 8 percent by weight.

In order to more clearly describe the nature of the present invention, a specific example will hereinafter be described. It should be understood, however, that this is done solely by way of example, and is intended neither to delineate the scope of the invention nor limit the ambit of the appended claims.

Example I

Dried tea leaf was introduced into a vented extractor and extracted with water at a temperature of about 212° F. After extraction, the extract was centrifuged to remove tea "fines." This extract contained about 2 percent soluble tea solids.

The extract was continuously introduced into the middle of a packed column. At the bottom of the column was a receiver having an overflow valve. The receiver was connected to a pump which pumped a portion of the extract from the receiver to a heat exchanger and back to the receiver. The temperature of the extract in the receiver was sufficient to produce steam. The steam evolved passed upwardly through the column countercurrent to the descending extract, and thus stripped the aroma and flavor constituents of the extract. The distillate was collected at a temperature in the range of from about 35° to about 212° F., and incorporated into suffcient spray dried tea to provide an aqueous mixture containing about 40 percent soluble tea solids. The aqueous mixture was frozen, freeze dried and incorporated into spray dried tea at a level of 2.5 to 8 percent by weight.

This product, when reconstituted in hot water, is similar in taste and aroma to freshly brewed tea.

What is claimed is:

1. A method for preparing an instant tea comprising providing a distillate of flavor and aroma constituents of tea, collecting the distillate at a temperature in the range of from about 35° to about 212° F., mixing the distillate with soluble tea solids, at least a portion of which is spray dried tea, to provide an aqueous mixture having a tea solids concentration of above about 20 percent by weight, freeze drying the aqueous mixture and mixing the freeze dried mixture with spray dried instant tea to obtain therein a level of the freeze dried mixture of from about 2.5 to about 8 percent by weight.

2. A method for preparing an instant tea as defined in claim 1, wherein the distillate is provided by stripping an aqueous extract of tea leaf.

3. A method for preparing an instant tea as defined in claim 2, wherein sufficient tea solids are mixed with the distillate to obtain an aqueous mixture containing from about 20 to about 45 percent by weight tea solids.

4. A method for preparing an instant tea as defined in claim 1, wherein sufficient tea solids are mixed with the distillate to obtain an aqueous mixture containing from about 20 to about 45 percent tea solids.

5. A method for preparing an instant tea as defined in claim 4, wherein the distillate is provided by steam distilling tea leaf.

References Cited

UNITED STATES PATENTS

| 3,554,761 | 1/1971 | Carbonell | 99—77 X |
| 3,163,539 | 12/1964 | Barch | 99—77 |

FRANK W. LUTTER, Primary Examiner

W. L. MENTLIK, Assistant Examiner